United States Patent [19]

Tsutsumi

[11] Patent Number: 4,465,034
[45] Date of Patent: Aug. 14, 1984

[54] SWIRL GENERATING ARRANGEMENT FOR AN INTERNAL COMBUSTION ENGINE

[75] Inventor: Saburo Tsutsumi, Yokohama, Japan

[73] Assignee: Nissan Motor Company, Limited, Yokohama, Japan

[21] Appl. No.: 211,366

[22] Filed: Nov. 28, 1980

[30] Foreign Application Priority Data

Dec. 4, 1979 [JP] Japan ............................ 54-167137[U]

[51] Int. Cl.³ ................................................ F02B 31/00
[52] U.S. Cl. ............................... 123/306; 123/52 M
[58] Field of Search ................ 123/52 M, 188 M, 306, 123/308, 470, 478

[56] References Cited

U.S. PATENT DOCUMENTS

| | | | |
|---|---|---|---|
| 1,727,265 | 9/1929 | Aseltine | 123/52 M |
| 3,318,292 | 5/1967 | Hideg | 123/306 |
| 3,408,992 | 11/1968 | Von Seggern et al. | 123/306 |
| 4,015,577 | 4/1977 | Elsbett et al. | 123/188 M |
| 4,228,772 | 10/1980 | Bakonyi | 123/188 M |
| 4,240,387 | 12/1980 | Motosugi et al. | 123/188 M |
| 4,256,062 | 3/1981 | Schafer | 123/308 |
| 4,344,394 | 8/1982 | Showalter | 123/188 M |

FOREIGN PATENT DOCUMENTS

| | | |
|---|---|---|
| 1576012 | 10/1970 | Fed. Rep. of Germany ... 123/188 M |
| 1928925 | 12/1970 | Fed. Rep. of Germany . |
| 2425182 | 10/1975 | Fed. Rep. of Germany . |
| 2921300 | 12/1979 | Fed. Rep. of Germany . |
| 2857252 | 1/1981 | Fed. Rep. of Germany . |
| 60523 | 2/1948 | Netherlands ........................ 123/306 |
| WO79/00501 | 8/1979 | PCT Int'l Appl. . |
| 332857 | 7/1930 | United Kingdom . |
| 1456318 | 11/1976 | United Kingdom . |

Primary Examiner—Craig R. Feinberg
Assistant Examiner—W. R. Wolfe
Attorney, Agent, or Firm—Schwartz, Jeffery, Schwaab, Mack, Blumenthal & Koch

[57] ABSTRACT

A rectangular vane is pivotally disposed in a rectangular cross-sectioned portion of an induction passage and operatively connected to a device such as the throttle valve of the engine. The vane accelerates the incoming charge and shapes it into a rectangular cross-sectioned jet stream having a flow component maximized in a plane normal to the cylinder axis. The induction passage in which the vane is disposed is oriented with respect to the cylinder so that the incoming jet stream enters the combustion chamber tangentially with respect to the wall of said cylinder to thereafter swirl about the combustion chamber. The strong horizontal (with respect to the cylinder axis) flow component ensures that the swirl will persist till the end of the compression stroke of the engine hence increasing the flame propagation speed which extends the lean burn limit and EGR tolerance of the engine.

12 Claims, 7 Drawing Figures

SWIRL GENERATING ARRANGEMENT FOR AN INTERNAL COMBUSTION ENGINE

BACKGROUND OF THE INVENTION

1. Field of the Invention

The present invention relates generally to an internal combustion engine and more particularly to a swirl generating arrangement for an internal combustion engine which enables the controllable generation of swirl about the combustion chamber which will persist even to the end of the compression stroke.

2. Description of the Prior Art

In a known arrangement a vane has been disposed in the induction passage and arranged to be essentially parallel to the cylinder axis. This vane is movable to vary the cross sectional area of the induction passage and accordingly increase the velocity of the incoming charge under given operating conditions and direct the charge into the combustion chamber so as to swirl about the axis of the cylinder. However, this arrangement has suffered from the drawback that the variable opening through which the charge flows is substantially rectangular and oriented with the longitudinal axis thereof essentially parallel with the cylinder axis. This accordingly introduces the charge into the combustion chamber with a relatively weak flow component in the plane normal to the cylinder axis. This has lead to the formation of a swirl within the combustion chamber which all but disappears as the piston approaches TDC during the compression stroke, at which time the swirl has the most value in promoting efficient combustion.

SUMMARY OF THE INVENTION

The present invention features an essentially rectangular swirl generating vane which is disposed in a rectangular cross-sectional portion of the induction passage in a manner to accelerate the charge and cause it to assume a jet stream which has a flow component maximized in the plane perpendicular to the cylinder axis. The induction passage is oriented with respect to the cylinder to introduce the jet stream into the combustion chamber tangentially with respect to the cylinder wall and accordingly produce a strong swirl which will persist even when the piston approaches TDC during the compression stroke. The vane is curved at the trailing end to promote laminar flow therepast and operatively connected to a control device which preferably takes the form of the engine throttle valve so that the vane can be moved in accordance with the induction of the engine and maintain the maximum velocity of the jet stream without any reduction in charging efficiency.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The features and advantages of the present invention will become more clearly appreciated from the following description taken in conjunction with the accompanying drawings in which like reference numerals denote corresponding elements, and in which.

DETAILED DESCRIPTION OF THE PREFERRED EMBODIMENTS

Figure 1:
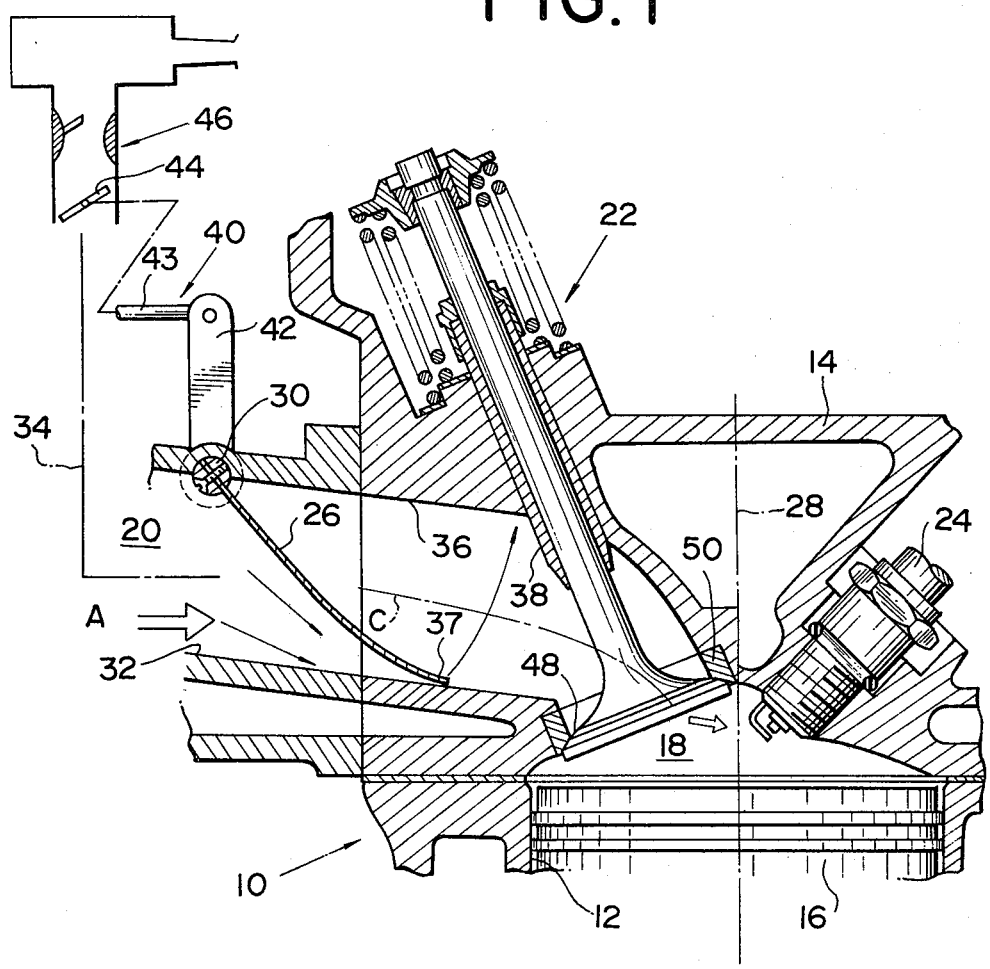
FIG. 1 is a sectional view showing a first embodiment of the present invention.
Figure 2:
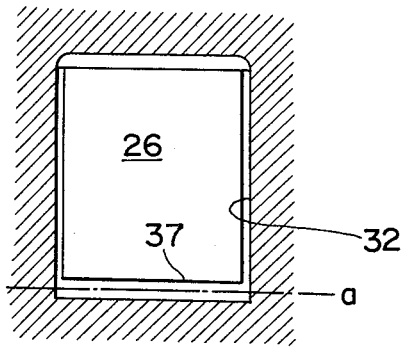
FIG. 2 is a view as seen in the direction of arrow A shown in FIG. 1.

Turning now to the drawings and more specifically to FIGS. 1 and 2 a first embodiment of the present invention is shown. In FIG. 1 the numeral 10 denotes an internal combustion engine having a cylinder 12 formed therein and a cylinder head 14 disposed so as to close one end of the cylinder. A piston 16 is reciprocatively disposed in said cylinder to define a variable volume combustion chamber 18. Leading from the combustion chamber to the ambient atmosphere is an induction passage 20. An intake valve 22 is disposed in a well known manner to control the communication between the combustion chamber 18 and the induction passage. A spark plug 24 or the like is disposed through the cylinder head 14 for the purposes of igniting the combustible mixture compressed in the combustion chamber during the compression stroke. A swirl generating vane 26 pivotally mounted on a shaft 30 is disposed in the induction passage 20 for the purposes of deflecting the incoming charge and directing same into the combustion chamber 18 with a strong swirl component in the plane normal to the cylinder axis 28. As best shown in FIG. 2 the vane is essentially rectangular and is disposed in a portion of the induction passage having a rectangular cross section having a width approximately the same as the vane to reduce the amount of charge which can flow past the lateral edges of said vane. In this embodiment the shaft 30 is disposed in a branch 32 of an induction manifold 34 so that the vane extends from the shaft to terminate in the induction port passage 36 formed in the cylinder head 14. As shown in FIG. 1 the vane 26 is arranged to approach the combustion chamber as closely as practical so that at the maximum deflection the trailing edge 37 thereof closely juxtaposes the intake valve guide sleeve 38. The trailing edge 37 is as shown in FIG. 1, smoothly curved to induce substantially laminar flow therepast and in the minimum deflection position defines a variable cross section elongate rectangular window as best seen in FIG. 2 the longest dimension of which extends in the direction a.

A linkage system 40 for controlling the angular displacement of the vane is provided and which takes the form of a lever 42 and a suitable shaft or cable 43, interconnects the rotatable shaft 30 and vane 26 with a suitable control device which in this case preferably takes the form of the throttle valve 44 of a carburetor 46. However, the device is not limited to the throttle valve and/or accelerator pedal and may take the form of any suitable control arrangement.

Figure 3:
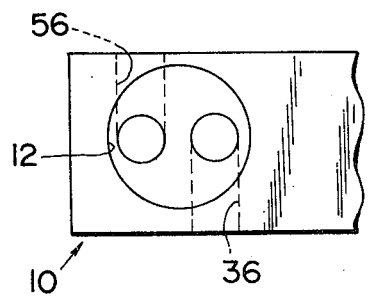
FIGS. 3, 4, and 5 are schematic plan views showing possible induction port arrangements which can be used in conjunction with the swirl generating arrangement of the present invention.

In operation when the engine is idling or operating at light load with the throttle valve 44 almost closed the interconnection between same and the vane 26 causes the vane to assume a position similar to that illustrated in FIG. 1. Accordingly as the air and/or air-fuel charge flows through the induction passage 20 it is deflected and accelerated by the vane. The flow after having passed the vane assumes a jet stream having a substantially rectangular cross section. This jet stream then flows through the clearance between the bevelled head 48 of the intake valve 22 and the valve seat 50 into the combustion chamber 18. As illustrated in FIG. 1 the center line C of the induction passage is arranged to be as close to parallel with the plane normal to the cylinder axis so as to transfer the charge toward the combustin chamber substantially horizontally as long as possible. Further as shown in FIG. 3 the induction passage is also arranged to introduce the charge into the combustion chamber tangentially with respect to the cylinder wall which, in combination with the horizontal nature of the induction passage with respect to the cylinder axis wherein the extrapolation of the bottom thereof passes between the bevelled intake valve head and the valve seat (when the intake valve is open) and the flow vane producing a jet stream with a rectangular cross section as previously described, causes the charge to be introduced into the combustion chamber to swirl therein with a strong horizontal (with respect to the "vertical" cylinder axis) flow component. Due to this strong horizontal flow component the swirl will persist even though the piston rises to approach its TDC position.

Figure 4:
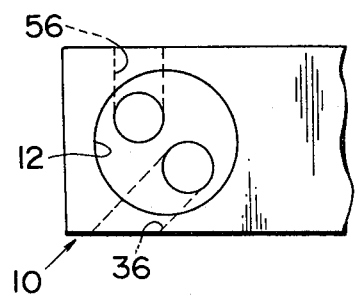
Figure 5:
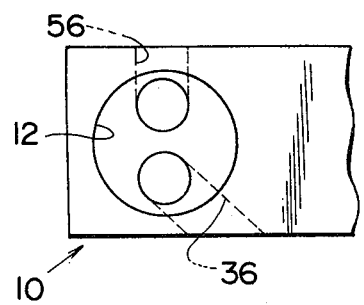

FIGS. 4 and 5 show alternate arrangements for introducing the charge into the combustion chamber tangentially with respect to the cylinder wall.

As the demand on the engine increases and the throttle valve is opened, the vane 26 is accordingly moved to increase the cross sectional area through which the charge can flow. However, as the increased opening of the throttle valve allows a greater volume of air to flow through the induction passage the effect of the swirl vane is maintained and without any unwanted flow restriction which would result in a loss in charging efficiency. Hence, under all operating conditions the optimal flow velocity past the vane is maintained.

Figure 6:
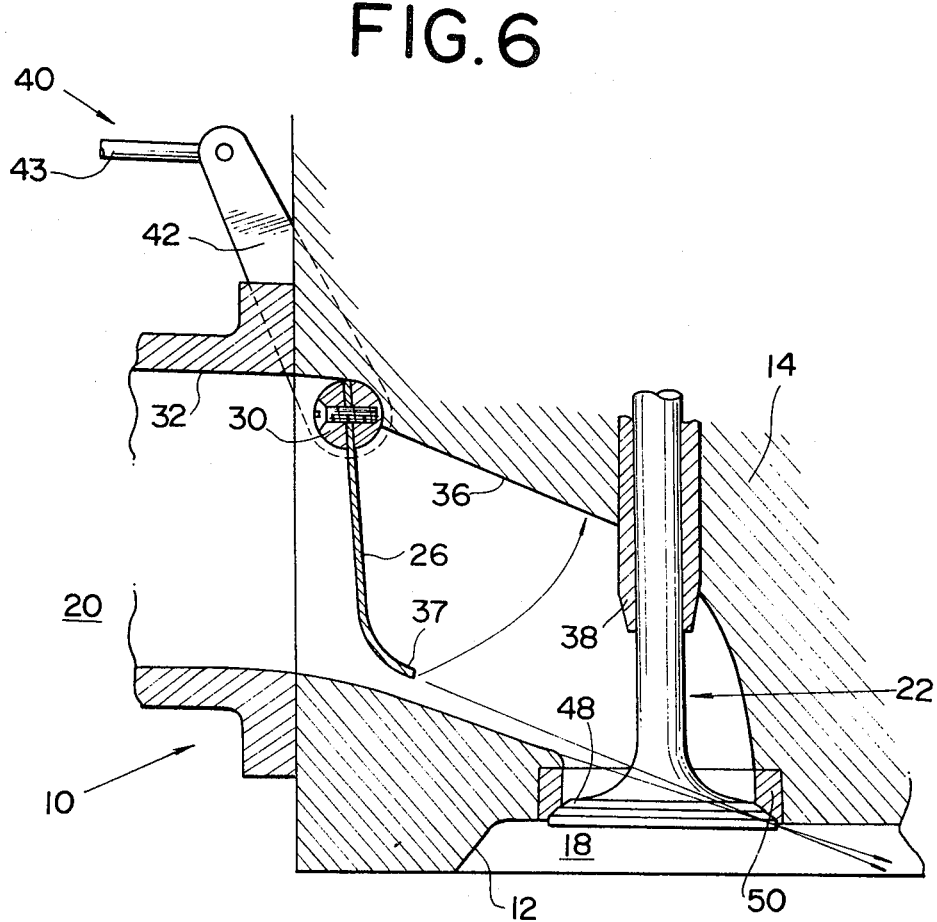
FIG. 6 is a sectional view showing a second embodiment of the present invention.

FIG. 6 shows a second embodiment of the present invention. In this embodiment the shaft 30 is mounted to the cylinder head 14. With this arrangement accurate setting of the minimum cross sectional area of the rectangular window is facilitated as different from the first embodiment wherein the vane is mounted to the induction manifold and arranged to extend into the induction port passage. However, with the second embodiment the linkage between the control device (throttle valve) and the lever 42 must be disconnected upon disassembly of the engine as compared with the arrangement of the first embodiment.

The trailing edge of the vane in the second embodiment is curved to terminate in a flat portion, the extrapolation which extends slowly towards and intersects with an extrapolation of the bottom of the induction port passage which also extends between the bevelled head 48 of the intake valve and the valve seat 50 (when the intake valve is open) to accordingly induce smooth flow therepast and direct the rectangular cross-sectional flow between the bevelled head of the intake valve and the valve seat into the combustion chamber. This in combination with the arrangement of the induction passages with respect to the cylinder (see FIGS. 3 to 5) introduces the charge into the combustion chamber tangentially with respect to the cylinder wall and with a strong horizontal flow component which sets up a strong swirl which will persist even to the end of the compression stroke.

The operation of the second embodiment is the same as the first and as such requires no description.

Figure 7:
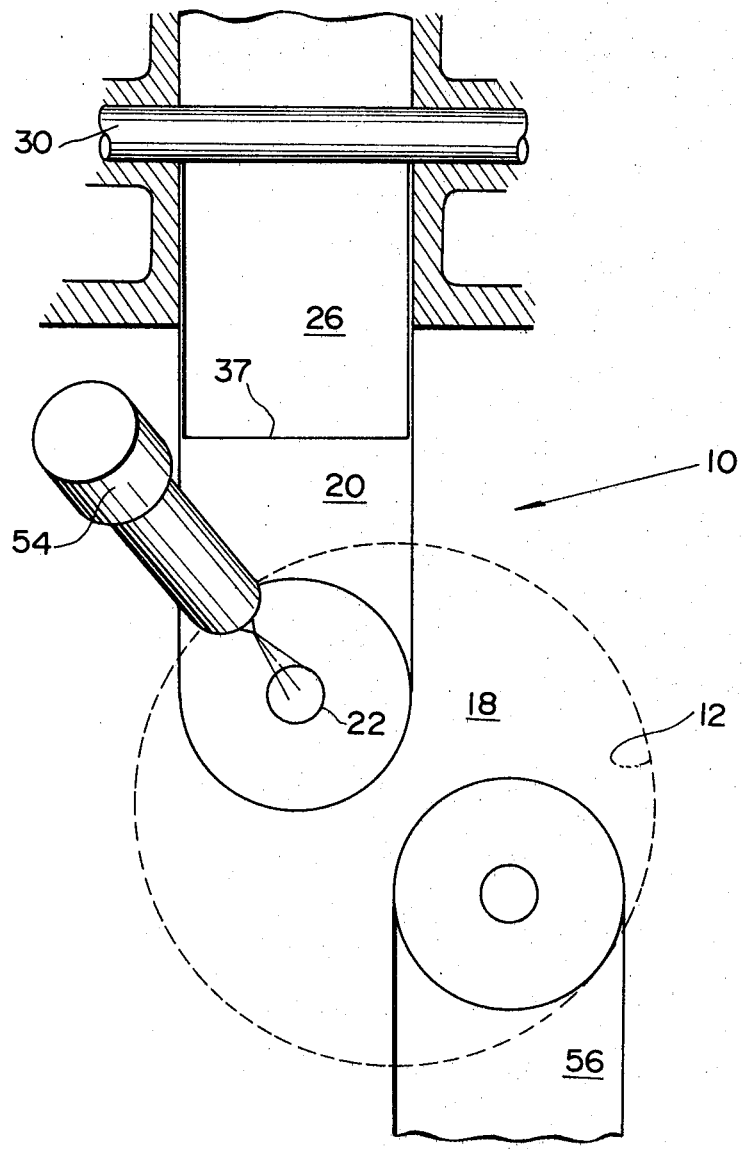
FIG. 7 is a schematic plan view showing a third embodiment wherein the swirl generating arrangement of the present invention is combined with a fuel injector.

FIG. 7 shows a third embodiment of the present invention. In this embodiment, the engine is fuel injected and equipped with a fuel injector 54 disposed to inject fuel toward the head of the intake valve 22 and accordingly into the rectangular cross-sectioned jet stream. This arrangement promotes intimate mixing of the air and the injected fuel which is subsequently swirled about the axis of the cylinder. Stable operation of the engine especially during the start up mode is promoted by this arrangement. In this figure the numeral 56 denotes an exhaust port passage.

Further in all of the embodiments described hereinbefore, the trailing edge of the vane can be formed with a curvature or curvatures which promote laminar flow therepast and minimize any eddy currents which would reduce the velocity and the effectiveness of the jet stream. The curvature(s) of course must be designed with the intended purpose of the engine in mind and the dimensions of the particular induction passage.

Further, with the present invention due to the presence of a strong swirl within the combustion chamber at the time of ignition of the charge therein, the flame propagation speed is increased, extending the lean burn limit of the engine and/or increasing the amount of exhaust gas recirculation thus enabling a reduction in the NOx, CO and HC emissions. The strong swirl in all cases promotes stable combustion at engine start up due to the particularly strong horizontal flow component which is not possible with the prior art.

Thus in summary, the present invention features a device which provides a variable cross section opening upstream of the combustion chamber which opening produces a jet stream having a strong flow component in a plane normal or perpendicular to the cylinder axis. This in combination with the itroduction of the stream into the cylinder tangentially with respect to the wall of the cylinder produces a strong swirl which persists up until the end of the compression stroke. Further, the cross sectional area of the opening is varied in accordance with the induction demands of the engine to maintain the maximum possible velocity of the stream without incurring any charging efficiency losses. The strong swirl accordingly established allows the extension of the lean burn limit and/or the increase in EGR (exhaust gas recirculation) tolerance.

The foregoing description of the preferred embodiments of the invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. In an internal combustion engine having a cylinder disposed about an axis and a piston slidable and in said cylinder to define a variable volume combustion chamber, the combination of:

an induction passage leading from said combustion chamber to a source of air, said induction passage being oriented with respect to said cylinder to introduce a fluid charge into said combustion chamber tangentially with respect to the wall of said cylinder whereby the charge enters said combustion chamber and swirls about said cylinder axis;

a valve for controlling fluid communication between said induction passage and said combustion chamber, said valve having a head and a seat; and a device disposed in said induction passage for defining a variable cross section opening having a shape which accelerates the incoming charge and forms said charge into a jet stream having a flow component in a plane normal to said cylinder axis maximized for enhancing the swirl about said cylinder axis, said device including a vane, pivotally mounted in said induction passage and having a generally rectangular configuration and a curved portion terminating at a trailing edge thereof for inducing laminar flow of said fluid charge therepast, said induction passage having a rectangular cross section where said vane is mounted so that said variable cross section opening is essentially rectangular and elongate, wherein the extrapolation of said curved portion passes between said head and said seat when said valve is in its open position, and wherein the extrapolation of the bottom of said induction passage also passes between said head and said seat when said valve is in said open position.

2. An internal combustion engine comprising:

at least one cylinder disposed about an axis and having a piston slidable therein to define at least one variable volume combustion chamber;

an induction passage leading from said combustion chamber to a source of air, said induction passage being oriented with respect to said cylinder to introduce a fluid charge into said combustion chamber tangentially with respect to the wall of said cylinder so that the charge enters said combustion chamber and swirls about said axis;

a throttle valve disposed in said induction passage for controlling the flow of fluid therethrough;

a valve for controlling fluid communication between said induction passage and said combustion chamber, said valve including a valve head and a valve seat, an extrapolation of the bottom of said induction passage passing between said valve head and said valve seat when said valve is in an open position; and a device located downstream of said throttle valve which includes a rectangular vane pivotally mounted in a section of said induction passage having a generally rectangular cross section for defining a variable cross section opening, said vane being located sufficiently close to said combustion chamber to accelerate the charge and form said charge into a jet stream having a generally rectangular cross section which is elongate in a direction parallel to a plane normal to said cylinder axis, said vane being further operable to cause a component of the flow entering the combustion chamber in said plane normal to said cylinder axis to be maximized to strengthen the swirl about said cylinder axis, said vane being formed with a curved portion at a trailing edge thereof for inducing laminar flow in said fluid charge, said curved portion terminating in an edge, an extrapolation of which passes between said valve head and said valve seat with the valve in said open position and said vane in a closed position wherein the area of said variable cross section opening is minimized.

3. An internal combustion engine comprising:

at least one cylinder disposed about an axis and having a piston slidable therein to define at least one variable volume combustion chamber;

an induction passage leading from said combustion chamber to a source of air, said induction passage being oriented with respect to said cylinder to introduce a fluid charge into said combustion chamber tangentially with respect to the wall of said cylinder so that the charge enters said combustion chamber and swirls about said axis;

a throttle valve disposed in said induction passage for controlling the flow of fluid therethrough;

a valve for controlling fluid communication between said induction passage and said combustion chamber, and a device disposed downstream of said throttle valve, said device comprising a rectangular vane pivotally mounted on a fulcrum disposed in a section of said induction passage having a generally rectangular cross section for defining a variable cross section opening, said vane being located sufficiently close to said combustion chamber to accelerate the charge and form said charge into a jet stream having a generally rectangular cross section which is elongate in a direction parallel to a plane normal to said cylinder axis and operable to cause a component of the flow entering the combustion chamber in said plane normal to said cylinder axis to be maximized to strengthen the swirl about said cylinder axis, said vane having a trailing edge which, when the vane pivots, travels in a direction generally parallel to said cylinder axis and which points, with respect to said fulcrum, generally towards said combustion chamber.

4. In a method of operating an internal combustion engine having a cylinder disposed about an axis and a piston slidable in said cylinder to define a variable volume combustion chamber, the steps of:

inducting a charge into said combustion chamber through an induction passage;

controlling the flow of charge through said induction passage using a throttle valve;

introducing said charge into said combustion chamber in a direction tangential with respect to the wall of said cylinder thus causing the charge to swirl in said combustion chamber about said cylinder axis;

controlling communication between said induction passage and said combustion chamber with a valve;

passing said charge through a variable cross section opening defined by a vane pivotally mounted in said induction passage downstream of said throttle valve;

accelerating and forming the charge flowing through said induction passage upstream of said valve into a jet stream having an essentially rectangular cross section which is elongate in a direction generally parallel to a plane normal to said cylinder axis; and locating said vane sufficiently close to said combustion chamber so that a component of the flow entering the combustion chamber in said plane generally normal to said cylinder axis is maximized to increase the strength of the swirl about said cylinder axis.

5. A method as claimed in claim 4, further comprising the step of varying the cross sectional area of said opening in response to an induction demand of the engine for maintaining maximum velocity of said jet stream without decreasing charging efficiency.

6. An internal combustion engine comprising:
   at least one cylinder disposed about an axis and having a piston slidable therein to define at least one variable volume combustion chamber;
   an induction passage leading from a source of air to said combustion chamber, said induction passage being oriented with respect to said cylinder to introduce a fluid charge into said combustion chamber tangentially with respect to the wall of said cylinder so that the charge enters said combustion chamber and swirls about said cylinder axis;
   a throttle valve disposed in said induction passage for controlling the flow of fluid therethrough;
   a valve for controlling fluid communication between said induction passage and said combustion chamber; and
   a vane pivotally mounted in said induction passage downstream of said throttle valve for defining a variable cross section opening, said vane being located upstream of and sufficiently close to said combustion chamber to be operable to accelerate the fluid charge and form said charge into a jet stream having a generally rectangular cross section which is elongate in a direction parallel to a plane normal to said cylinder axis and to cause a component of the flow entering the combustion chamber in said plane normal to said cylinder axis to be maximized to strengthen the swirl about said cylinder axis, said vane being operable to pivot between a position of minimum cross section opening and a position which generally points towards said valve.

7. An internal combustion engine as claimed in claim 6, wherein said device is responsive to induction load to increase the cross sectional area of said opening in accordance with the amount of charge inducted into said engine to prevent a reduction in charging efficiency.

8. An internal combustion engine as claimed in claim 1, further comprising a fuel injector disposed to inject fuel into said induction passage downstream of said device and toward the head of said valve so as to be entrained in said jet stream.

9. An internal combustion engine as claimed in claim 6, wherein said vane has a rectangular configuration and said induction passage has a rectangular cross section where said vane is mounted.

10. An internal combustion engine as claimed in claim 9, wherein said vane is operatively connected to said throttle valve.

11. An internal combustion engine as claimed in claim 9, wherein said vane is formed with a curved portion at a trailing edge thereof for inducing laminar flow in said fluid charge.

12. An internal combustion engine as claimed in claim 6, wherein said vane pivots about a fulcrum and has a trailing edge which pivots in a direction generally parallel to said cylinder axis and which points, with respect to said fulcrum, generally towards said combustion chamber.

* * * * *